United States Patent [19]
Chester et al.

[11] Patent Number: 5,964,468
[45] Date of Patent: Oct. 12, 1999

[54] ANTI-BUCKLING SPIRAL WOUND GASKET

[76] Inventors: Rickey W Chester, 5625 Hair Rd., Disputanta, Va. 23842; David G. Malgee, 3261 Jersey Ct.; Paul F. Malgee, 621 Rebel Ridge Rd., both of Colonial Heights, Va. 23834; Alfred F. Waterland, III, 40 Plum Point Rd., Elkton, Md. 21921

[21] Appl. No.: 08/783,094

[22] Filed: Jan. 14, 1997

[51] Int. Cl.$^6$ .................................................... F16J 15/12
[52] U.S. Cl. .......................... 277/610; 277/616; 277/633; 277/637
[58] Field of Search ................................... 277/633, 610, 277/603, 608, 627, 616, 637

[56] References Cited

U.S. PATENT DOCUMENTS

| | | |
|---|---|---|
| Re. 29,702 | 7/1978 | Owen et al. . |
| 441,406 | 11/1890 | Gringras et al. . |
| 1,100,182 | 6/1914 | Hettinger . |
| 1,636,363 | 7/1927 | Hettinger . |
| 1,774,002 | 8/1930 | Hardy et al. . |
| 1,942,703 | 1/1934 | Hubbard et al. . |
| 2,196,953 | 4/1940 | Bohmer, Jr. et al. . |
| 2,200,212 | 5/1940 | Bohmer, Jr. et al. . |
| 2,339,479 | 1/1944 | McCreary . |
| 2,442,312 | 5/1948 | Price et al. . |

(List continued on next page.)

FOREIGN PATENT DOCUMENTS

| | | |
|---|---|---|
| 91 13 953 | 1/1992 | Germany . |
| 1026714 | 4/1966 | United Kingdom . |
| WO 94/15191 | 7/1994 | WIPO . |
| WO 95/32376 | 11/1995 | WIPO . |

OTHER PUBLICATIONS

Metallic Gaskets for Pipe Flanges—Ring–joint, Spiral–wound, and Jacketed. ASMEB16.20–1993. Issued by The American Society of Mechanical Engineers.

Inward Buckling of Flexible Graphite Spiral Wound Gaskets for Piping Flanges, Rod. T. Mueller/Exxon Research & Engineering Company. Presented at the 6th Annual Technical Symposium of the Fluid Sealing Association—Oct. 6–8, 1996, Houston, Texas.

A Performance Based Specification for Spiral Wound Gaskets, Jerry Waterland/Signum Manufacturing Company. Presented at the 6th Annual Technical Symposium of the Fluid Sealing Association—Oct. 6–8, 1996, Houston, TX.

Inward Buckling of Spiral Wound Gaskets, Larry A. Stanford/Garlock Metallic Gaskets. Presented at the 6th Annual Technical Symposium of the Fluid Sealing Association—Oct. 6–8, 1996, Houston, Texas.

The Behaviour of Gaskets for Bolted Flanged Connections, M. Derenne and L. Marchand/Ecole Polytechnique' de Montreal. Mar. 1994.

Gasket Performance Characterization for Bolted Flanged Connections, M. Derenne, J.R. Payne, L. Marchand/Ecole Polytechnique' de Montreal—Tightness Testing and Research Laboratory. Oct., 1994.

*Primary Examiner*—Anthony Knight
*Assistant Examiner*—Alison K. Pickard
*Attorney, Agent, or Firm*—Cummings & Lockwood

[57] ABSTRACT

An improved spiral wound gasket is disclosed that deters and redirects buckling. The invention includes the following: an integral inner ring, a gasket element, outer wraps and a outer guide ring. The integral inner ring is a winding of a thin strip of metal of at least seven revolutions that is overlapped over itself and secured to itself. The gasket element is wound around the integral inner ring and includes a second thin strip of metal and also a thin strip of filler material so as to form alternate layers of the thin strip of metal and filler material. The outer wraps are a winding around the circumference of the gasket element of a thin strip of metal. The invention also discloses a new outer guide ring that has a inside edge that, together with the outside circumferential edge of a spiral wound gasket, defines apertures. These apertures or expansion zones allow filler material to displace radially outwardly rather than radially inwardly to form buckles.

27 Claims, 6 Drawing Sheets

U.S. PATENT DOCUMENTS

| | | |
|---|---|---|
| 2,442,313 | 5/1948 | Price et al. . |
| 2,457,694 | 12/1948 | Lippincott et al. . |
| 2,466,263 | 4/1949 | Nardin et al. . |
| 2,520,089 | 8/1950 | Lippincott . |
| 2,606,800 | 8/1952 | Teetor et al. . |
| 2,809,080 | 10/1957 | Mittell et al. . |
| 2,827,320 | 3/1958 | Kane . |
| 2,828,987 | 4/1958 | Schmitz . |
| 2,882,083 | 4/1959 | Palumbo et al. . |
| 3,195,906 | 7/1965 | Moyers et al. . |
| 3,306,622 | 2/1967 | Liebig et al. . |
| 3,336,035 | 8/1967 | Price et al. . |
| 3,356,378 | 12/1967 | Tracy et al. . |
| 3,556,541 | 1/1971 | Salono . |
| 3,573,873 | 4/1971 | Pearson . |
| 3,815,927 | 6/1974 | Geipel et al. . |
| 3,837,657 | 9/1974 | Farnum et al. . |
| 3,854,736 | 12/1974 | Farnum et al. . |
| 3,905,090 | 9/1975 | Painter et al. . |
| 3,926,445 | 12/1975 | Farnum . |
| 4,019,244 | 4/1977 | Owen et al. . |
| 4,070,219 | 1/1978 | Farnam et al. . |
| 4,127,277 | 11/1978 | Owen et al. . |
| 4,189,819 | 2/1980 | Nicholson et al. . |
| 4,364,982 | 12/1982 | Gee et al. . |
| 4,455,334 | 6/1984 | Ogino et al. . |
| 4,505,485 | 3/1985 | Hirakawa . |
| 4,516,784 | 5/1985 | Merz et al. . |
| 4,544,169 | 10/1985 | Cobb et al. . |
| 4,575,917 | 3/1986 | Kana et al. . |
| 4,607,851 | 8/1986 | Usher . |
| 4,629,199 | 12/1986 | Yamamoto et al. . |
| 4,673,187 | 6/1987 | Hanson et al. . |
| 4,982,492 | 1/1991 | Noguchi et al. . |
| 4,998,345 | 3/1991 | Funahashi et al. . |
| 5,085,250 | 2/1992 | Kendrick et al. . |
| 5,161,807 | 11/1992 | Allen et al. . |
| 5,275,423 | 1/1994 | Allen et al. . |
| 5,411,274 | 5/1995 | Yahagi et al. . |
| 5,421,594 | 6/1995 | Becerra . |
| 5,454,604 | 10/1995 | Yahagi et al. . |
| 5,511,797 | 4/1996 | Nikirk et al. . |
| 5,527,047 | 6/1996 | Waterland, III et al. . |
| 5,547,203 | 8/1996 | Binford et al. . |
| 5,664,791 | 9/1997 | Owen ..................................... 277/204 |
| 5,683,091 | 11/1997 | Isoe et al. ............................... 277/204 |

FIG_2

ANTI-BUCKLING SPIRAL WOUND GASKET

BACKGROUND OF THE INVENTION

This invention relates to seals and gaskets, and more particularly to a spiral wound gasket. The spiral wound gasket of the present invention includes improvements that reduce the problem of inner buckling of the gasket when it is compressed during installation.

Spiral wound gaskets are well known in the industry. Typically, a spiral wound gasket includes a thin metal strip between which strips of filler material are interspersed as the strip is wound upon itself forming a winding about a central axis. A number of different metals can be used for the thin metallic strip. Each material provides its own particular characteristics to meet desired specifications. Likewise, various filler materials can be used. Typically, the filler material employed is a soft strip of material that is deformed when the spiral wound gasket is compressed between pipe flanges thereby providing desired sealing characteristics.

Spiral wound gaskets are normally disposed between opposed flanges of mating pipe ends. The pipe flanges are clamped together by means of circumferentially spaced bolts or any other suitable fastening arrangement. In many situations, outer guide rings are used in conjunction with and become part of a spiral wound gasket assembly. The outer guide rings are mounted around the outside circumference of a spiral wound gasket. The outer guide rings are usually formed from carbon steel and serve a number of different functions in the gasket assembly. A primary function of the outer guide ring is to act as a compression limiter, so the gasket assembly is not compressed beyond design limits. Additionally, the outer guide ring provides increased radial strength to the gasket assembly. Moreover, the outer guide ring facilitates installation by providing a positive centering of the gasket on the pipe flange.

By design, a spiral wound gasket can be compressed from its original manufactured thickness of approximately 0.175" down to the outer guide ring thickness of 0.125'. As the spiral wound gasket is compressed two things are occurring. First of all, depending upon the compressibility of the filler material, the filler itself is being compressed such that there is an overall reduction in the volume of the gasket element. Once the filler is compressed to its "full density" there can be no further reduction in the gasket volume. Compression beyond this point merely displaces the fixed volume of the gasket. Three predominate filler materials used today are mica-graphite, flexible graphite and PTFE. While both the mica-graphite and flexible graphite are compressible and will allow some degree of volume reduction within the gasket as it is being compressed, sintered PTFE is essentially uncompressible and the compression of a spiral wound gasket with this filler results only in a displacement of the original volume. However, due to the lack of control that exists with conventional gasket winding equipment, much of the initial compressibility that exists with the graphite filler materials is reduced as the gasket is being produced, rendering it essentially incompressible even before the gasket is installed in a flange. To enhance the mechanical reliability and sealing performance of gaskets today, gaskets are installed using much higher bolt loads than were typically used in the past. These higher bolt loads are overcoming the resistance of the fully compressed filler/gasket element and forcing volume displacement as the gasket is deflected down to the thickness of the outer retaining ring. The implosion of the gasket at the inside diameter, otherwise referred to as inner buckling, is the result.

There are substantial problems or concerns as a result of inner buckling. First of all, when the gasket buckles during installation there is a corresponding loss of bolt load because of the stress relief that has occurred. Secondly, a protrusion of the gasket into the pipe bore not only creates turbulent flow, but it is also likely to break the gasket and cause "unwinding" into the flow stream, ultimately creating a total loss of seal. An object called a "pipe pig" is often shot through pipe runs to clear any scale or clogs along the inside of the pipe. Along with normal flow through the pipe, use of a pipe pig can also break the gasket and cause it to unwind and fail if it has buckled into the inside diameter.

A separate inner retaining ring was once considered to be a solution to the inward buckling of spiral wound gaskets. Inner rings have become a requirement in national standards (ASME B16.20) on many sizes and filler styles of spiral wound gaskets to aid in resisting the distortion of the gasket in the radially inward direction. For instance, all spiral wound gaskets having PTFE as a filler material are required to have an inner ring. Now it is recognized, however, that this alone will not prevent inward buckling. While these inner rings impede the displacement or flow of the gasket into the inside diameter of the pipe, they are physically unable to completely prevent this inward flow because of their narrow cross section. The inside diameter of the gasket remains as the weakest plane. Unfortunately, these inner rings add considerably to the cost of the spiral wound gasket. These increased costs result from the cost of the metal itself (typically a stainless steel or exotic alloy), machining costs, labor costs to install it and finally the cost of inventorying a separate line item. Also, their fit within the spiral wound gasket inside diameter is often variable. Often times they fall out during handling or shipping, creating a sense of unreliability.

Another phenomena that occurs when there are extreme radial forces that are developed during compression is "dishing" of the outer guide ring. The normally flat outer guide ring becomes dished, or forced into a convex or concave shape, as high radial forces are developed. As the ring becomes dished, still higher bolt loads must be exerted upon it to render it flat again so that it performs as a true 0. 125' compression stop.

SUMMARY OF INVENTION

The present invention discloses a way to eliminate the occurrence of inward buckling of spiral wound gaskets during installation, regardless of the type of filler material or level of manufacturing sophistication used. Specifically, this is accomplished by reinforcing the gasket at its inner diameter and modifying the outer guide ring so as to allow and encourage gasket element flow or buckling to be directed towards the outer diameter of the gasket where it is not a problem. An integral inner ring is an economical way to reinforce the inside diameter of a spiral wound gasket. This reinforced integral inner ring discourages the inward buckling of spiral wound gaskets during installation. The invention also includes an outer guide ring having built-in expansion apertures that allow the displacement of the gasket element toward the outside diameter of the spiral wound gasket assembly during installation. The improved outer guide ring may be used alone or in combination with the integral inner ring. Similarly, the integral inner ring may be used alone or in combination with the improved outer guide ring.

In a further aspect of the present invention, the integral inner ring comprises many spot welds around the diameter of each overlapping revolution of the integral inner ring to strengthen the integral inner ring. Alternatively, the integral inner ring may be strengthened by having the overlapping revolutions of thin metal strip continuously welded to the next inside revolution of thin metal strip.

In a still further aspect of the present invention, an easily-manufactured integral inner ring is provided for a spiral wound gasket. The disclosed integral inner ring may be manufactured so that it is precisely rigid enough to resist and redirect the flow of the gasket element towards the outside diameter, and at the same time be cost effective and perform this task better and with greater reliability than an inner retaining ring used today.

In still a further aspect of the present invention, the spiral wound gasket is comprised of an outer guide ring with fingers that carry the spiral wound gasket, thereby forming expansion apertures that relieve excessive compression stresses in a planned, predictable fashion during installation.

In still another aspect of the present invention the fingers are oriented in the outer guide ring and placed equidistant from each next adjacent finger.

In still a further aspect of the present invention, the spiral wound gasket has internal expansion apertures or expansion ridges that allow the gasket element to flow radially outwardly during compression.

Also disclosed is a spiral wound gasket comprising an integral ring, a gasket element, and outer wraps; said integral inner ring being a winding of a first thin strip of metal of at least seven revolutions and having an internal periphery of a pre-selected shape wherein said first thin strip of metal overlaps itself with each revolution in an ever increasing circumference and further wherein said overlapping first thin strip of metal is secured to itself to prevent unwinding; said gasket element being a winding around the integral inner ring of a second thin strip of metal and also incorporating a thin strip of filler material so as to form alternate layers of the second thin strip of metal and the thin strip of filler material wherein said gasket element has a shape in the form of the pre-selected shape; and said outer wraps being a winding around the gasket element of a third thin strip of metal of at least one revolution, so that the third thin strip of metal overlaps itself enough to secure it to itself and prevent unwinding; whereby the spiral wound gasket is deterred by the integral inner ring from buckling radially inwardly as a result of compression during installation.

An yet, also disclosed is a spiral wound gasket assembly comprising an integral inner ring, a gasket element, outer wraps and an outer guide ring; said integral inner ring being a winding of a first thin strip of metal of at least seven revolutions and having an internal periphery of a pre-selected shape wherein said first thin strip of metal overlaps itself with each revolution in an ever increasing circumference and further wherein said integral inner ring is secured to itself around each overlapping revolution; said gasket element being a winding around the integral inner ring of a second thin strip of metal and also incorporating a thin strip of filler material so as to form alternate layers of the second thin strip of metal and the thin strip of filler material wherein said gasket element has a shape in the form of the pre-selected shape; said outer wraps being a winding around the gasket element of a third thin strip of metal of at least one revolution, so that the third thin strip of metal overlaps itself enough to secure it to itself and prevent unwinding; and said outer guide ring being an annular ring having flat parallel sides and defining an aperture having a shape and circumference substantially the same as the outside shape and circumference of said outer wraps; whereby the spiral wound gasket is deterred by the integral inner ring from buckling radially inwardly as a result of compression during installation.

DETAILED DESCRIPTION OF THE INVENTION

Reference is now made to the drawings that illustrate the claimed invention. It should be understood that the invention is not limited to these embodiments. Others skilled in the art may make modifications or alterations upon reading and understanding the specification.

Figure 1:
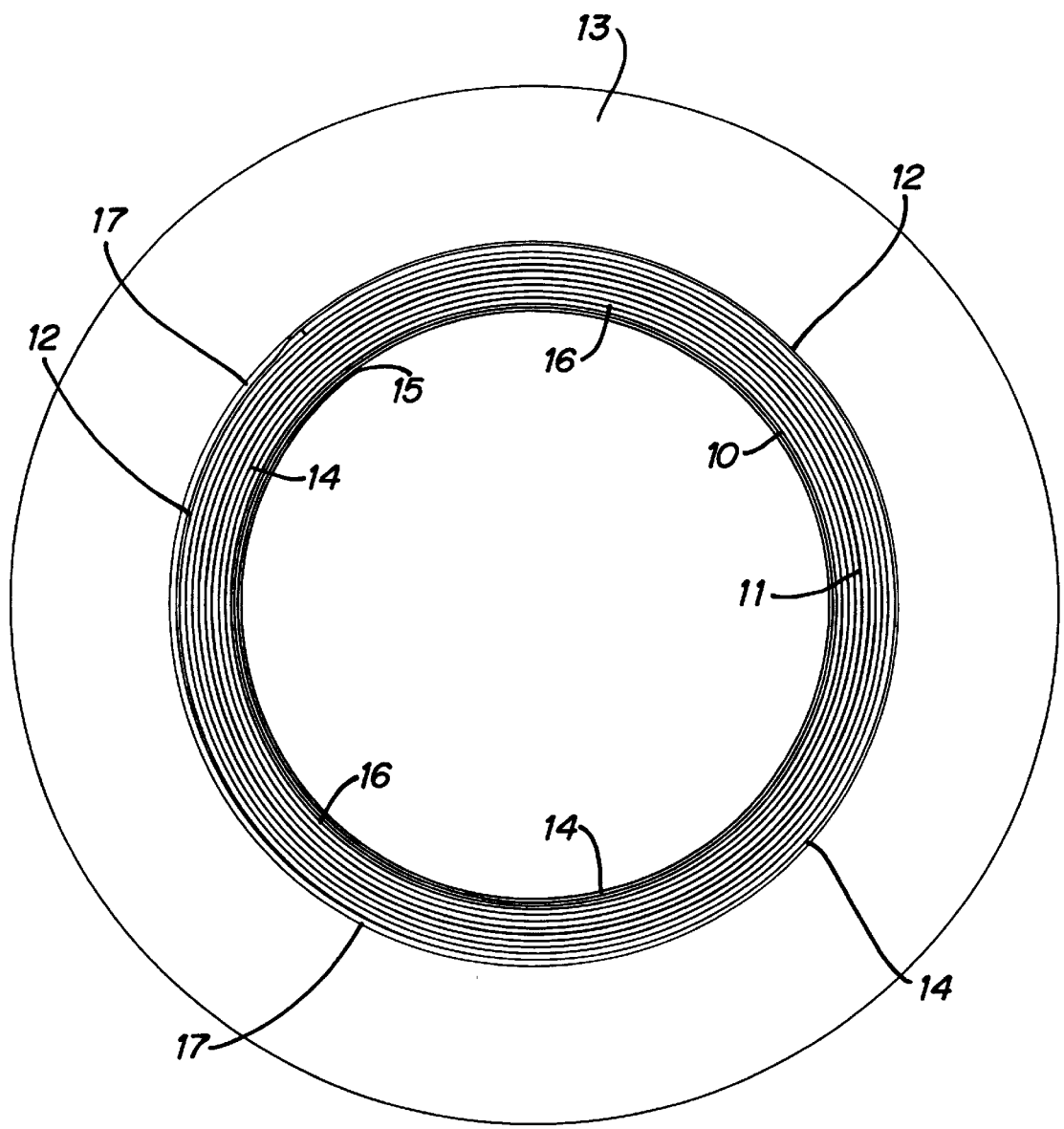
FIG. 1 is a front, elevation view of a conventional, spiral wound gasket assembly.

FIG. 1 illustrates a conventional, prior art, spiral wound gasket that has inner wraps 10, a gasket element 11, outer wraps 12, and an outer guide ring 13. In this and the other illustrated embodiments, the subject matter is a round spiral wound gasket. It shall be understood by those skilled in the art that oval or other types of shapes may be similarly wound and used for spiral wound gaskets. A manufacturer merely chooses a preselected a shape and uses a correspondingly-shaped mandrel about which to wind the gasket.

The inner wraps 10 are a winding of approximately three revolutions of a thin strip of metal 14. The precise number of revolutions comprising the inner wraps, along with other dimensional requirements, is dictated by the national design standard for spiral wound gaskets, ASME B16.20. The metal strip has a generally "V" shape cross section. These inner wraps are made by taking this thin strip of metal and wrapping it around a mandrel having a preselected shape—in this case a circular shape, so that it overlaps itself with each revolution in an ever increasing circumference. The inner free end 15 and the first revolution of the thin strip of metal is secured by spot welds to the adjacent overlapping revolution of thin metal strip. As required by the ASME specification, there are spot welds only at least every three inches around the circumference of the first revolution of the thin metal strip.

The gasket element 11 is wound around the inner wraps. The gasket element 11 is a winding of the continuation of the thin strip of metal 14 next to a thin strip of filler material 16 that are together wound around the inner wraps 10 in the same shape as the inner wraps. The width of the thin strip of filler material 16 is approximately the same as the width of the thin strip of metal 14. The width of the filler material is selected such that the filler is approximately the same height as the metal windings when wound. The number of revolutions of the thin strip of metal and thin strip of filler material that comprise the gasket element will depend upon the end use or specification of the particular spiral wound gasket. A narrow cross section spiral wound gasket will have a gasket element with as few as three revolutions. More typically, the gasket element will have more than six revolutions. The result is a gasket element with revolutions of filler material sandwiched between thin metal plies.

The outer wraps 12 shown are a winding of slightly more than one revolution of just the thin strip of metal 14. Three or more revolutions are typical. This thin strip of metal is wrapped around the circumference of the outside periphery of the gasket element. The thin strip of metal that makes up the outer wraps is spot welded to secure the last metal wrap to the one it lays on to prevent the entire spiral wound gasket from unwinding. As can be seen in FIG. 1, the outer wraps are made of the same continuous thin strip of metal as used throughout the entire gasket. These three sections, the inner wraps, gasket element and outer wraps are collectively referred to throughout as a spiral wound gasket.

The outer guide ring 13 is a solid annular ring having flat, parallel sides. The outer guide ring has an inside edge 17 the same circumference and shape as the outer circumference and shape of the spiral wound gasket. The inside edge 17 of the outer guide ring is between the two flat, parallel sides and has a groove machined into it. That groove is designed to accept the ridge of the "V" shape cross section metal strip making up the outer wraps of the spiral wound gasket. The spiral wound gasket is pressed or snapped into contact with the outer guide ring and carried by the outer guide ring by an interference fit. A spiral wound gasket carried by an outer guide ring is collectively referred to as a spiral wound gasket assembly.

Figure 2:
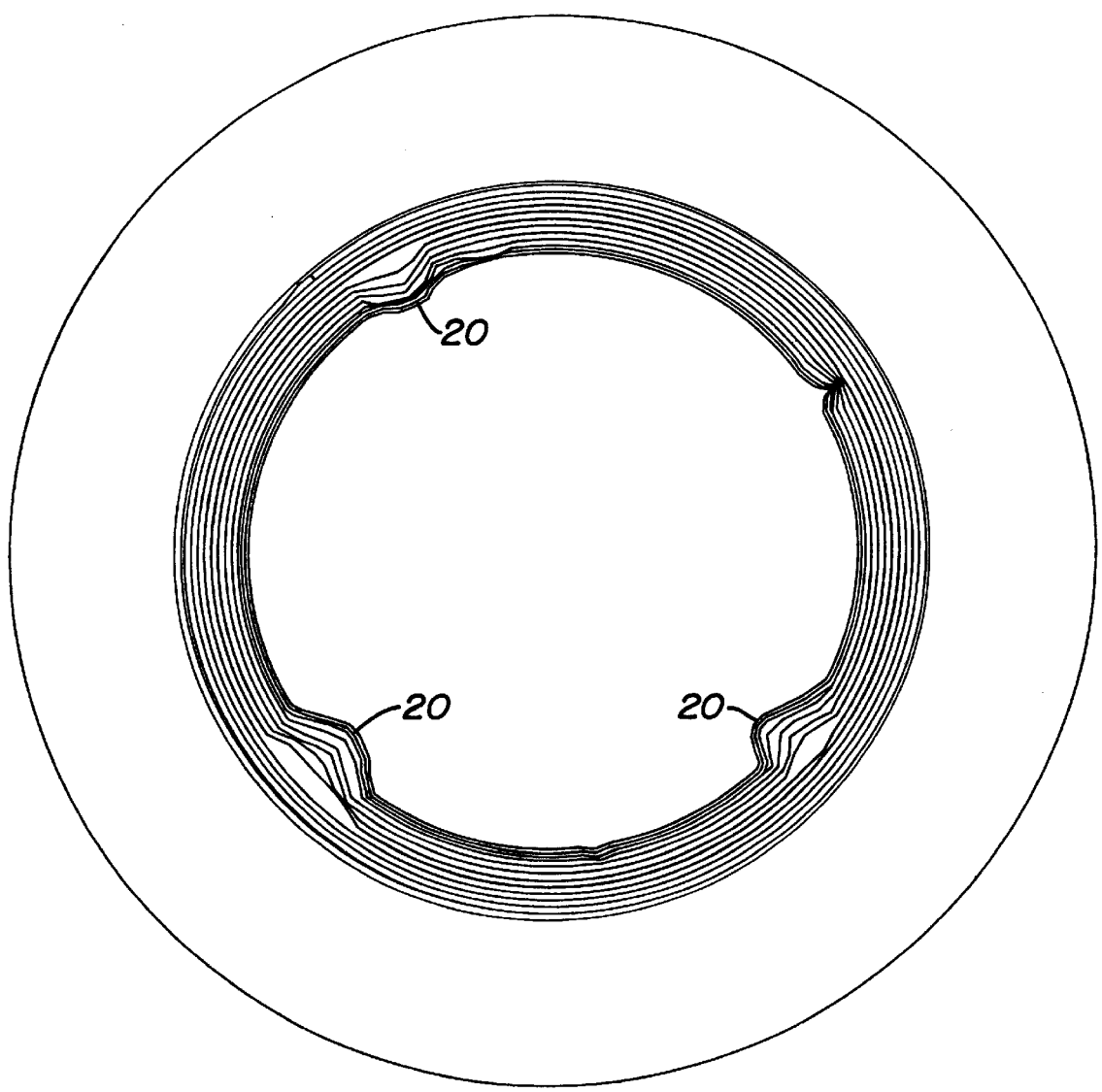
FIG. 2 is a front, elevation view of a conventional, spiral wound gasket assembly that has buckled after it has been compressed as during installation.

FIG. 2 is a drawing that is demonstrative of the problem of buckling in conventional gaskets such as those illustrated in FIG. 1. The spiral wound gasket assembly in FIG. 2 is identical in its structure to the spiral wound gasket assembly described in FIG. 1. The spiral wound gasket in FIG. 2 has been compressed as it would be during installation between the flange ends of two pipes being joined together. As these pipes are joined together by tightening the bolts, the gasket element is compressed. Once the filler material within the gasket element can no longer compress upon itself, it reacts to the increasing bolt load by flowing in whichever direction it can. This displacement is restricted in the radial outward direction because of the outer guide ring. Consequently, the gasket element has moved in the radially inward direction and caused protuberances 20 that extend into the inside diameter of the gasket. FIG. 2 illustrates examples of this phenomenon which is known as inward buckling. The degree of inward buckling varies widely based, at least in part, upon the amount of compression during installation, the density or compressibility of the filler material, the sophistication of the winding equipment that was used to produce the gasket, and the installation. A minor displacement of the gasket element may cause only small deformation that does not affect the performance of a spiral wound gasket. Substantial displacement may result in damage to the effectiveness and life of a spiral wound gasket. It should also be noted that this buckling phenomenon is not readily apparent to visual inspection, because the gasket is covered by the pipe flanges after installation. In other words, failures resulting from buckling are typically not detected until the gasket fails or disrupts.

Figure 3:
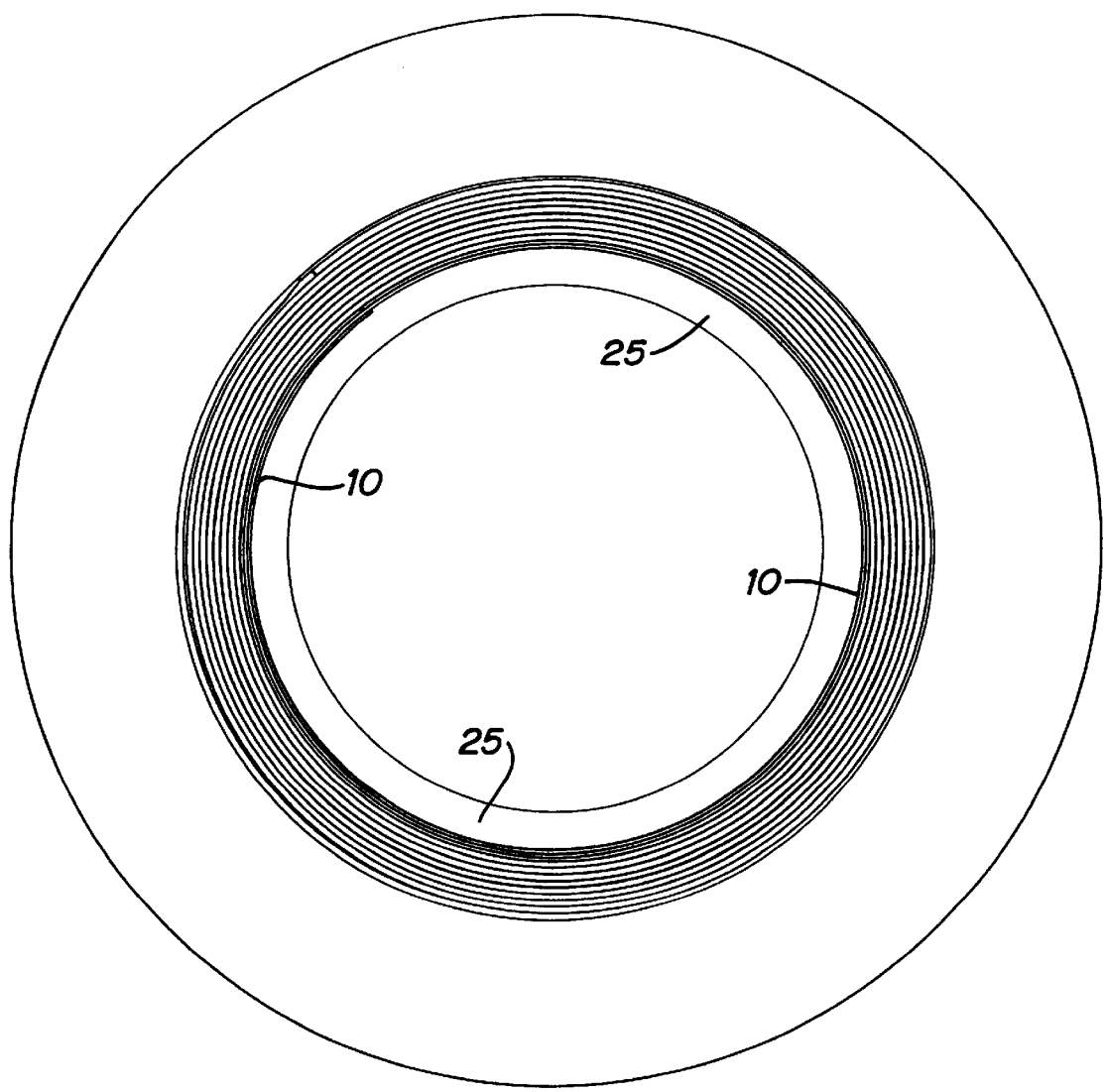
FIG. 3 is a front, elevation view of a conventional, spiral wound gasket assembly with an inner retaining ring.

FIG. 3 is a drawing of an attempted solution to the problem of buckling. The spiral wound gasket assembly displayed in FIG. 3 is the same as the spiral wound gasket assembly in FIG. 1 except there is a separate inner retaining ring 25. This inner ring 25 is a solid annular ring having flat, parallel sides and an outer circumference the same as the inside diameter of the inner wraps 10. Typically, there is a chamfer machined around the circumference of the outside edge of the inner ring that fits within the "V" cross section of the spiral wound gasket. The inner ring, therefore, is pressed or snapped into the inside diameter of the inner wraps and remains in contact with it. During installation, there is a reduced tendency for inward buckling because of the inner ring, providing that the strength of the inner ring is sufficient to resist the displacement forces that can be generated.

Figure 4:
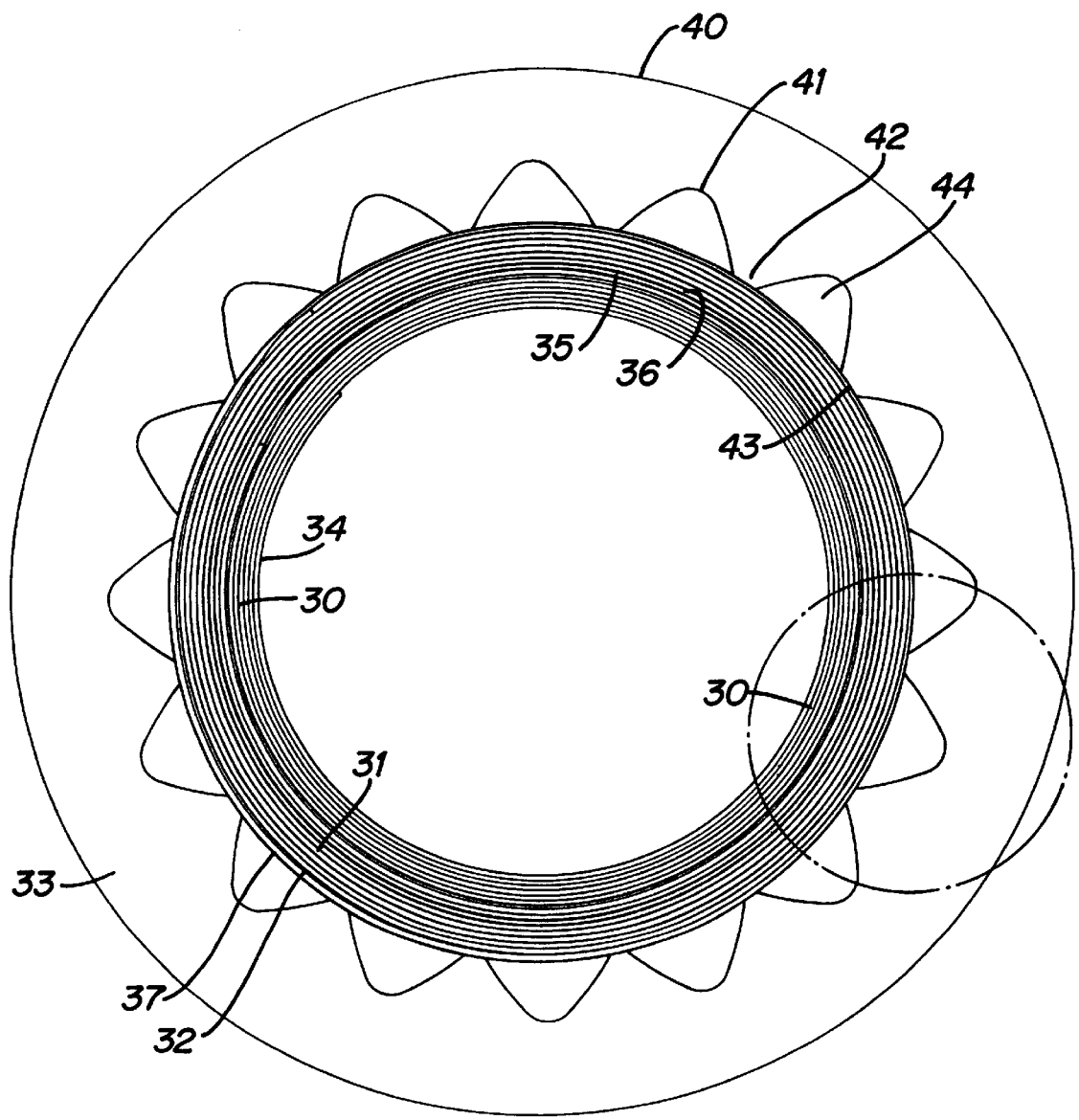
FIG. 4 is a front, elevation view of a spiral wound gasket assembly that has an integral inner ring and a preferred embodiment of an outer guide ring according to the disclosed invention.
Figure 5:
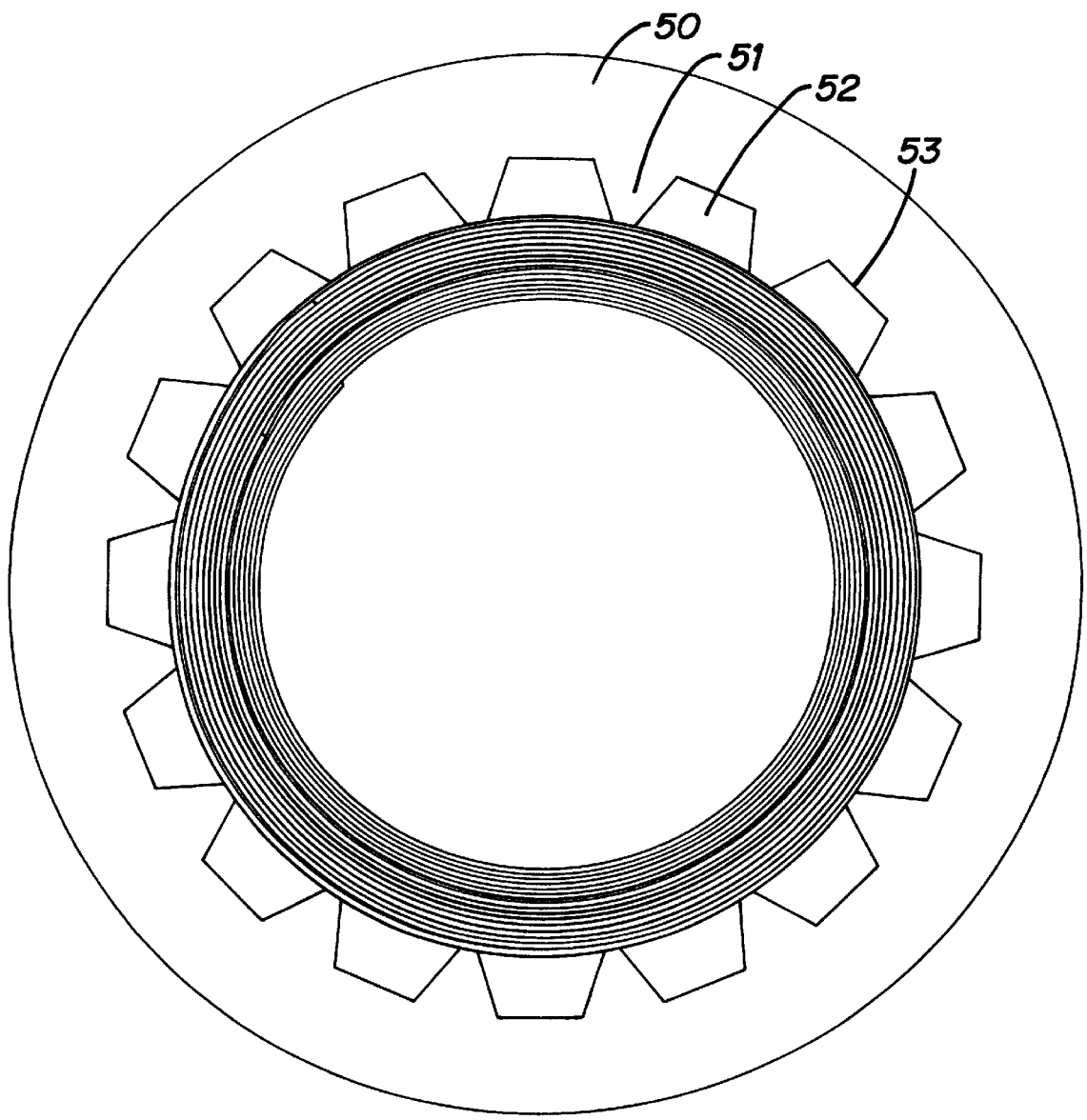
FIG. 5 is a front, elevation view of a spiral wound gasket assembly that has an integral inner ring and an alternative embodiment of an outer guide ring according to the disclosed invention.

FIGS. 4 and 5 illustrate a spiral wound gasket assemblies having an integral inner ring 30, gasket element 31, outer wraps 32 and outer guide ring 33. As discussed earlier, the internal periphery of the integral inner ring 30 has the same circumference and preselected shape as a mandrel about which the integral inner ring is wound. As shown, the integral inner ring is a winding of seven revolutions of a first thin strip of metal 34 before the gasket element begins. Each of the revolutions of the first thin strip of metal of the integral inner ring is secured to the next adjacent revolution by means of numerous spot welds around its circumference. The spot welds are placed at a plurality of locations around the circumference of each revolution of the seven revolutions of the integral inner ring. Preferably, spot welds are applied at a spacing of ½" to 1" apart around the circumference of each and every revolution. Alternatively, there may be a continuous weld joining each revolution of the integral inner ring to the adjacent inside revolution of the integral inner ring. The result is an inner winding that is much more resistant to radial deformation than three loose wraps by themselves and that acts as a solid inner ring yet is much easier and cheaper to produce and has fewer problems associated with it.

The integral inner ring may be made from a separate, thin strip of metal that may have a different width or thickness or may be made of a different metal from a second or a third thin strip of metal used to make up the gasket element and outer wraps. The width of the first thin strip of metal making up the integral inner ring may also be greater or smaller than the width of the second and third thin strips of metal making up the gasket element or outer ring depending on the actual end use of the spiral wound gasket and the nature of the filler material. The dimensional thickness of the different thin strips of metal may also vary.

The illustrated embodiment in FIG. 4 displays an integral inner ring having seven revolutions. The examples discussed later herein had seven revolutions. If a spiral wound gasket is to be exposed to high compression stresses, more than seven revolutions may be required to contain the inward flow. Up to 15 revolutions have been tested under various conditions.

The gasket element 31 is comprised of a winding of a second thin strip of metal 35, in this case a continuation of the same metal strip as the integral inner ring, wound together with a thin strip of filler material 36 around the integral inner ring in the same shape as the integral inner ring. The preselected shape of the gasket element will match the preselected shape of the mandrel about which the spiral wound gasket is wound. The preselected circumference will depend on the circumference of the outside edge of the integral inner ring. The outside circumference (a function of the number of revolutions) of the gasket element is calculated according to the requirements of the application or to be in compliance with national standards (ASME B 16.20).

The outer metal wraps 32 as shown are comprised of a winding of slightly more than one revolution of a third thin strip of metal 37. This thin strip of metal is wrapped around the circumference of the outside periphery of the gasket element 31. The final revolution is spot welded to secure the outer wraps to itself and prevent the entire spiral wound gasket from unwinding.

In FIGS. 4 and 5, the first, second and third thin strips of metal are actually a single, continuous thin strip of metal. However, different strips of metal may be used in the three components of the spiral wound gasket (the integral inner ring, gasket element and outer wraps). Similarly, a separate thin strip of metal may be used to form the integral inner ring or outer wraps with the respective other two components being made from a single continuous strip of metal. Those skilled in the art will recognize that varying the width, thickness and/or material of the thin strips of metal for the three components is yet another way to customize a spiral wound gasket to a specific purpose.

FIGS. 4 and 5 further illustrate spiral wound gasket assemblies having preferred embodiments of a new outer guide ring comprising the present invention. Referring specifically to FIG. 4, the outer guide ring 33 is an annular ring having flat, parallel sides and an outer edge 40 that defines the outside circumference of the outer guide ring 33. In this case, the outer edge 40 is a circle. Other shapes may be applicable in other gasket applications. The inside edge 41 of the outer guide ring defines a plurality of fingers 42. These fingers 42 are adjacent to and have portions 43 in contact with the outer circumference of the outer wraps of a spiral wound gasket. The portions 43 of the fingers in contact with the outer circumferential edge of the outer wraps have a groove on their inside edge to receive the "V" shape cross sectional portion of the outer wraps. The spiral wound gasket is pressed or snapped into the groove on the inside edge of the fingers 42 so that the fingers are in contact with the outer wraps of the spiral wound gasket. The inside edge 41 of the outer guide ring between the fingers extends towards, but not all the way to, the outer edge 40 of the outer guide ring.

In FIG. 4, the line of the inside edge of the outer guide ring is curved to roughly resemble a sine wave. The inside edge 41 of the outer guide ring between the fingers and the outer circumferential edge of the spiral wound gasket define apertures 44. These apertures are expansion apertures or zones into which the gasket element is directed to flow during its compression. In FIG. 4, the fingers 42 are spaced evenly about the circumference of the circle. The result is that each finger is spaced equidistant from the next adjacent finger. The symmetric placement of fingers around the circumference of the inside edge of the outer guide ring provides for even forces against the spiral wound gasket during handling and installation.

The size, shape and numbers of the expansion apertures may vary. This size is varied by how close the inside edge comes to the outer circumference of the outer guide ring. Also the portion of the fingers that is actually in contact with the outer circumferential edge of the outer ring may vary. In the illustrated embodiments of FIGS. 4 and 5, the length of the spiral wound gasket circumference that is in contact with the fingers is much less than the length of the outer circumference of the spiral wound gasket that is not in contact with the fingers. This allows for substantial area into which the filler material may flow during compression.

The spiral wound gaskets shown in FIGS. 4 and 5 may be either conventional gaskets, with or without a separate, conventional inner ring, or a spiral wound gasket having an integral inner ring as discussed herein.

FIG. 5 shows an alternative embodiment of the outer guide ring 50 having fingers 51 that carry a spiral wound gasket. The apertures 52 are defined by more straight lines in the inside edge 53 of the outer guide ring. Obviously, there is an almost infinite number of designs of the inside edge of the outer guide ring that could define apertures between the inside edge and the outer circumference of the spiral wound gasket. Also the number and relative placement of the fingers will be at the discretion of a designer. Any design that provides for an expansion zone or that directs the flow outward is included in this invention.

Figure 6:
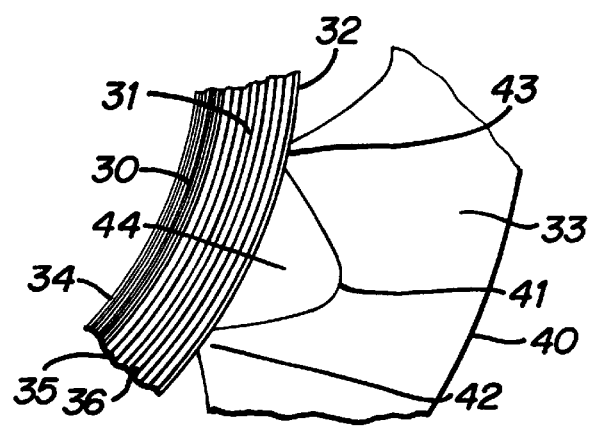
FIG. 6 is a blow-up of a portion of the spiral wound gasket assembly shown in FIG. 4.

FIG. 6 is a blow-up of a section of the spiral wound gasket assembly shown in FIG. 4. FIG. 6 shows the integral inner ring, gasket element, outer ring and outer guide ring.

Figure 7:
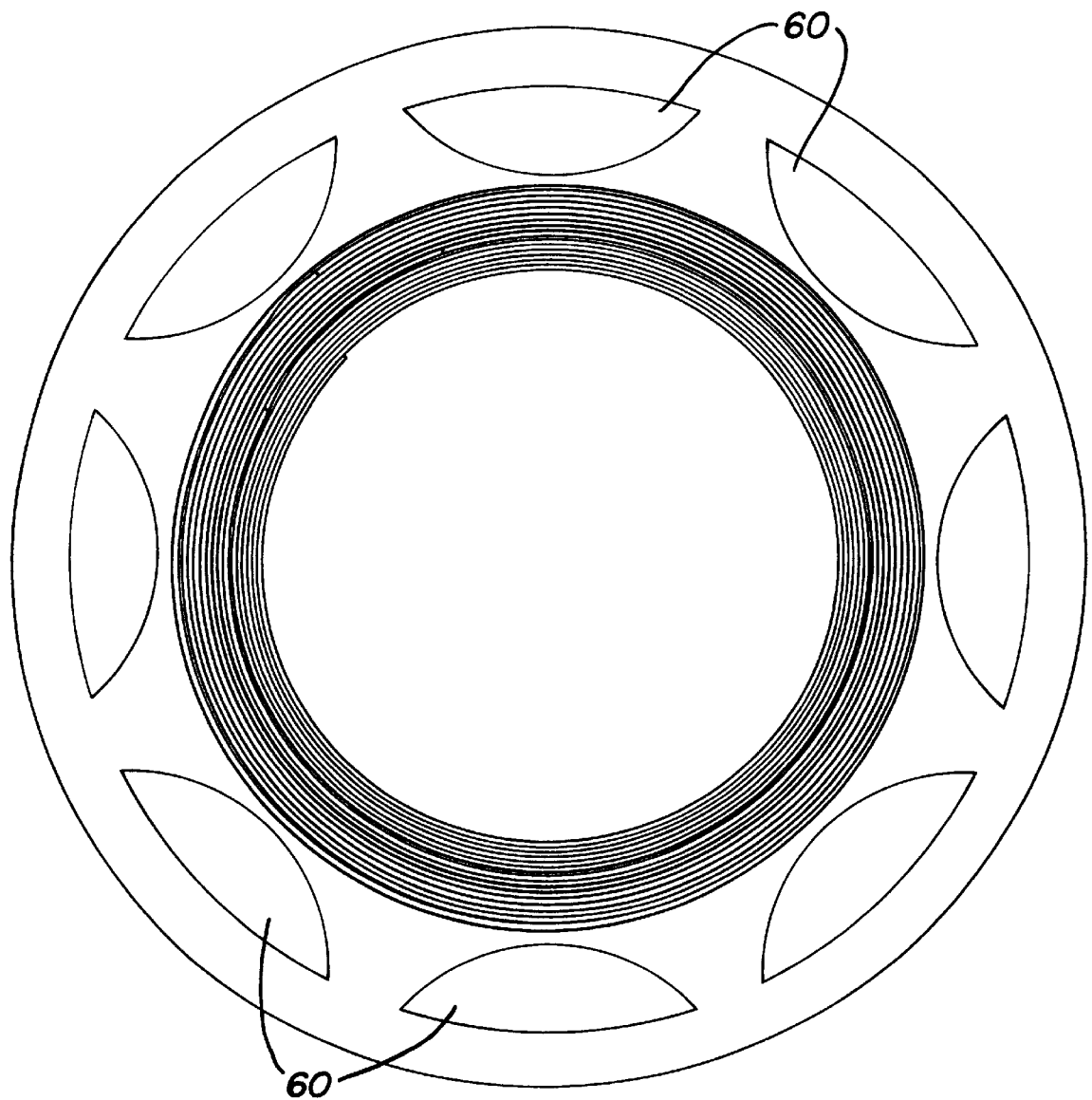
FIG. 7 is a front, elevation view of a spiral wound gasket assembly that has an integral inner ring and an outer guide ring with internal expansion apertures.

FIG. 7 shows a spiral wound gasket assembly including an outer guide ring with internal expansion apertures 60. These apertures reduce the volume occupied by the outer guide ring and allow the outer guide ring itself to radially compress when the gasket element is displaced and flows radially outwardly into the outer guide ring during installation. Internal expansion apertures 60 may be used alone or in combination with the expansion apertures shown in FIGS. 4 and 5 that are defined by the outer circumferential edges of the outer wraps and the inside edge of the outer guide ring. The internal expansion apertures themselves are nothing more than voids in the annular, outer guide ring. These voids are defined and encompassed entirely in the annular ring between the outside edge of the annular ring and the inside edge. The annular ring has flat, parallel sides. The distance between the sides defines the thickness of the annular ring. The voids extend across the entire thickness of the outer guide ring. The spiral wound gasket shown in FIG. 7 is the same as shown in FIGS. 4 and 5.

The shape and location of these internal expansion apertures are determined by considering the same factors to be considered when designing the expansion apertures discussed earlier. One of ordinary skill in the art calculates the amount of expansion volume needed to allow for the flow of the gasket element during installation. Also, the expansion forces must be calculated based on the radial outward flow of the gasket element. The size of the internal expansion apertures must be large enough to allow for the outward flow. The location of the internal expansion apertures, that is, how close to the inside diameter of the outer guide ring, will be determined so the load required to burst or allow outward gasket element flow is less than the expansion forces noted above. It may be necessary to nick or cut an outside wall of the internal expansion aperture so that the portion of the outer guide ring between the internal expansion aperture and the gasket will bend or burst and allow outward flow of the gasket element.

Alternatively, an outer guide ring may be machined so that, instead of apertures that extend through the entire thickness of the outer guide ring, there are ridges or depressions in the outer guide ring that reduce the volume occupied by an outer guide ring. These expansion ridges do not extend through the entire thickness of the outer guide ring. For instance there could be machined into one or both of the faces of an outer guide ring concentric or spiral ridges that extend substantially but not all the way through the thickness of the outer guide ring. These expansion ridges could be present in a small amount up to virtually the entire radial width of the outer guide ring. By machining material out of a portion of the outer guide ring, the outer guide ring is able to be compressed in the radial direction when the gasket element is displaced and flows radially outwardly during installation. Accordingly, the gasket element is able to flow in the radially outward direction by compressing the outer guide ring.

The actual size, depth, shape and other physical dimensions of the expansion ridges are based on the same considerations discussed earlier. That is, enough volume must be removed from the outer guide ring to offset the volume of gasket element that flows radially outwardly during installation. The expansion ridges actually collapse together like an accordion when the gasket element flows outwardly.

Many types of material may be used for the pliant filler material. Preferred materials include the following: mica-graphite, expanded graphite (Grafoil), PTFE, "expanded" PTFE (GORE-TEX), graphite/rubber mixture, rubber compounds, ceramic fibers/cloth, nonasbestos fibers/rubber mixtures, asbestos fibers/rubber mixtures and polypropylene. If proper manufacturing controls are employed such that the compressible fillers are not compressed too much during the manufacturing process, the reinforced inside diameter will allow uniform compression of the filler to occur in a designed manner such that full density of the filler is achieved simultaneously with gasket deflection down to the thickness of the outer guide ring. In such a case, the gasket experiences pure compression (reduction of volume due to compaction) and there is little to no volume displacement that occurs. Although manufacturing constraints often make this selection of filler material impractical, it is still a factor to consider during filler selection. Various materials may be used for the metal that makes up the integral inner ring, inner wraps, gasket element, outer wraps, outer guide ring and conventional inner ring. Preferred materials include, but are not limited to, the following; carbon steel, stainless steel, Hastelloy, Inconel, Monel, Nickel, Alloy-20 and titanium.

Testing of production gaskets assembled using various combinations of the current technology and the features of this invention was performed. The testing performed followed the room temperature tightness testing protocol developed at the Ecole Polytechnique—TTRL, for the investigation of gasket behavior. For Configuration 1, compressive load corresponding to a gasket stress of 10,000 PSI was applied to the product. For configurations 2, 3 and 4, a second stressing operation to 20,000 PSI was performed. The gaskets were compressed between ASME B 16.5 raised face flanges. The load was applied using a hydraulic cylinder monitored with a precision pressure indicating device.

Configuration 1
Expanded Graphite Filled Gaskets Mounted into Conventional Outer Guide Rings. (See, e.g., FIG. 1)

The testing followed the method described above.

The test items were loaded to a gasket stress equal to 10,000 PSI. They were removed and examined at this point. Inward buckling and winding rupture was observed in four areas at the inner area of the gasket. FIG. 2 displays buckles representative of those observed.

Configuration 2
Integral Inner Ring Design Constructed with Expanded Graphite Filler Mounted into a Conventional Outer Guide Ring.

The testing followed the above described methodology.

Inspection of the tested product at the 10,000 PSI gasket stress point disclosed no inward buckling deformation at the gasket inner circumference. They were reloaded to the 20,000 PSI stress point. Inspection disclosed very minor "dimples" at the gasket inner circumference. These dimples were of a magnitude commonly acceptable to the gasket industry standards.

Configuration 3
Integral Inner Ring Design Constructed with Expanded Graphite Filler Mounted into an Outer Guide Ring with Expansion Zones.

The testing performed followed the same methodology as described above.

The test items were loaded to a gasket stress equal to 10,000 PSI. They were removed and examined at this point with no indication of inward buckling present. Deformations observed as rounded humps in the gasket outer circumference were evident in the expansion zones.

The gaskets were re-loaded to a stress of 20,000 PSI. Re-inspection indicated no inward buckling deformation of the gaskets toward the inside circumference. Displacement of the gasket element into the expansion zones was very distinct. The volume of material displaced into the expansion zones was found to be roughly equal to that of the change of volume caused by movement of the flanges through loading, minus the volumetric loss caused by compression and densification of the semi-compressible expanded graphite material.

Configuration 4
Integral Inner Ring Design Constructed with PTFE Filler Winding Mounted into Outer Guide Rings with Expansion Zones.

The testing performed followed the same methodology as described above.

Inspection of the tested product at the 10,000 PSI gasket stress point disclosed no inward buckling deformation at the gasket inner circumference. There was noticeable displacement of outer circumference material into the expansion zones of the outer guide ring.

Inspection of the tested product at the 20,000 PSI stress point disclosed no buckling to the gasket inner circumference. There was significant displacement of the outer circumference gasket materials into the expansion zones of the outer guide ring. The volume of material displaced into the expansion zones was found to be roughly equal to that reduction of volume caused by the inward travel of the piping flanges and resultant compression of the gasket. In this example, the volume of the material displaced was larger than that observed when using semi-compressible fillers, as performed in Configuration 3, above.

The invention has been described with reference to preferred embodiments. Obviously, modifications and alterations will occur to others upon a reading and understanding of this specification. It is intended to include all such modifications and alterations insofar as they come within the scope of the intended claims or the equivalents thereof.

That which is claimed is:

1. A spiral wound gasket comprising an integral inner ring, a gasket element, and outer wraps;
    said integral inner ring being a winding of a first thin strip of metal of at least seven revolutions and having an internal periphery of a pre-selected shape wherein said first thin strip of metal overlaps itself with each revolution in an ever increasing circumference and further wherein said first thin strip of metal is secured to itself along multiple points of each revolution;
    said gasket element being a winding around the integral inner ring of a second thin strip of metal and also incorporating a thin strip of filler material so as to form alternate layers of the second thin strip of metal and the thin strip of filler material wherein said gasket element has a shape in the form of the pre-selected shape;

and said outer wraps being a winding around the gasket element of a third thin strip of metal of at least one revolution, wherein the final revolution of said third thin strip of metal secured to the subsequent revolution of said third thin strip of metal to prevent unwinding;

said integral inner ring secured to itself around each overlapping revolution, whereby the spiral wound gasket is deterred by the integral inner ring from buckling radially inwardly as a result of compression during installation.

2. The spiral wound gasket of claim 1 wherein said integral inner ring is a winding of said first thin strip of metal of at least eleven revolutions.

3. The spiral wound gasket of claim 1 wherein said first thin strip of metal in said integral inner ring is secured to itself by spot welds at a plurality of locations around each revolution.

4. The spiral wound gasket claim 1 wherein said first thin strip of metal in said integral inner ring is secured to itself by a continuous weld of each overlapping strip of metal to each overlapped strip of metal.

5. The spiral wound gasket of claim 1 wherein the first, second and third thin strips of metal are a single, continuous thin strip of metal.

6. The spiral wound gasket of claim 1 wherein the number of revolutions of said first thin strip of metal in said integral inner ring are less than the number of revolutions of said third thin strip of metal in said outer wraps.

7. The spiral wound gasket of claim 6 wherein the number of revolutions of said first thin strip of metal in said integral inner rings are equal to or greater than about seven, and the number revolutions of said third thin strip of metal in said outer wraps is equal to or less than about three.

8. A spiral wound gasket assembly comprising an integral inner ring, a gasket element, outer wraps and an outer guide ring;

said integral inner ring being a winding of a first thin strip of metal of at least seven revolutions and having an internal periphery of a pre-selected shape wherein said first thin strip of metal overlaps itself with each revolution in an ever increasing circumference and further wherein said integral inner ring is secured to itself alone multiple points around each overlapping revolution;

said gasket element being a winding around the integral inner ring of a second thin strip of metal and also incorporating a thin strip of filler material so as to form alternate layers of the second thin strip of metal and the thin strip of filler material wherein said gasket element has a shape in the form of the pre-selected shape;

said outer wraps being a winding around the gasket element of a third thin strip of metal of at least one revolution, wherein the final revolution of said third thin strip of metal is secured to the subsequent revolution of said third thin strip of metal to prevent unwinding; and said outer guide ring being an annular ring having flat parallel sides and defining an aperture having a shape substantially the same as the outside shape of said outer wraps and a circumference larger than the circumference of said spiral wound gasket;

whereby the spiral wound gasket is deterred by the integral inner ring from buckling radially inwardly as a result of compression during installation.

9. The spiral wound gasket assembly of claim 8 wherein said integral inner ring is a winding of said first thin strip of metal of at least eleven revolutions.

10. The spiral wound gasket of claim 8 wherein said first thin strip of metal in said integral inner ring is secured to itself by spot welds at a plurality of locations around each revolution.

11. The spiral wound gasket assembly of claim 8 wherein said first thin strip of metal in said integral inner ring is secured to itself by a continuous weld of each overlapping strip of metal to each overlapped strip of metal.

12. The spiral wound gasket assembly claim 8 wherein the first, second and third thin strips of metal are a single, continuous thin strip of metal.

13. A spiral wound gasket assembly of claim 8 wherein the outer guide ring further includes internal expansion apertures between an outside edge and an inside edge of the outer guide ring, said internal expansion apertures extending through an entire thickness of the ring and of such size and dimension to allow for outward flow of the spiral wound gasket when such spiral wound gasket is installed.

14. A spiral wound gasket assembly of claim 8 wherein the outer guide ring further includes expansion ridges between an outside edge and an inside edge of the outer guide ring, said ridges extending into at least one side of the ring but not extending through an entire thickness of the outer guide ring and of such size and dimension to allow for outward flow of the spiral wound gasket when such spiral wound gasket is installed.

15. A spiral wound gasket assembly comprising an integral inner ring, a gasket element, outer wraps and an outer guide ring;

said integral inner ring being a winding of a first thin strip of metal of at least seven revolutions and having an internal periphery of a pre-selected shape wherein said first thin strip of metal overlaps itself with each revolution in an ever increasing circumference and further wherein said integral inner ring is secured to itself along multiple points of each revolution;

said gasket element being a winding around the integral inner ring a second thin strip of metal and also incorporating a thin strip of filler material so as to form alternate layers of the second thin strip of metal and the thin strip of filler material wherein said gasket element has a shape in the form of the pre-selected shape;

said outer wraps being a winding around the gasket element of a third thin strip of metal of at least one revolution, wherein the final revolution of said third thin strip of metal is secured to the subsequent revolution of said third thin strip of metal to prevent unwinding; and said outer guide ring having an outer circumference and comprising an annular ring of desired shape having flat, parallel sides, an outer edge that defines the outer circumference of the outer guide ring, and an inside edge that carries said integral inner ring, gasket element and outer wraps within the outer guide ring;

said inside edge of the outer guide ring defining a plurality of fingers that are adjacent to and have at least portions in contact with the outer circumferential edge of said outer wraps wherein said integral inner ring, gasket element and outer wraps are carried by said fingers, wherein said inside edge between said fingers extends generally towards, but not all the way to, the outer circumference of the outer guide ring, and wherein apertures are defined by the outer circumferential edge of the outer wraps and the inside edge of the outer guide ring when the outer guide ring is carrying the spiral wound gasket;

whereby, the spiral wound gasket is deterred from buckling radially inwardly as a result of compression during installation.

16. The spiral wound gasket assembly of claim 15 wherein said integral inner ring is a winding of said first thin strip of metal of at least eleven revolutions.

17. The spiral wound gasket of claim 15 wherein said first thin strip of metal in said integral inner ring is secured to itself by spot welds at a plurality of locations around each revolution.

18. The spiral wound gasket assembly of claim 15 wherein said first thin strip of metal in said integral inner ring is secured to itself by a continuous weld of each overlapping strip of metal to each overlapped strip of metal.

19. The spiral wound gasket assembly of claim 15 wherein the first, second and third thin strips of metal are a single, continuous thin strip of metal.

20. The spiral wound gasket assembly of claim 15 wherein each of said fingers is spaced equidistantly from the next adjacent fingers.

21. The spiral wound gasket of claim 15 wherein the portion of the outer circumferential edge of the spiral wound gasket assembly that is in contact with said fingers is less than the portion of the outer circumferential edge of the spiral wound gasket assembly that is not in contact with said inside edge of said outer guide ring.

22. An outer guide ring comprising an annular ring of desired shape having flat, parallel sides, the distance between which sides defines the thickness of the annular ring, an outside edge that defines an outside circumference of the outer guide ring, an inside edge that carries a spiral wound gasket within the outer guide ring, and internal expansion apertures between the outside edge and inside edge of the outer guide ring, said internal expansion apertures being voids entirely between the outside circumference and inside edge of the outer guide ring and extending through the entire thickness of the annular ring and of such size and dimension to allow for outward flow of the spiral wound gasket when such spiral wound gasket is installed.

23. An outer guide ring comprising an annular ring of desired shape having generally flat, parallel sides, the distance between which sides defines the thickness of the annular ring, an outside edge that defines an outside circumference of the outer guide ring, an inside edge that carries a spiral wound gasket within the outer guide ring, and expansion ridges between the outside edge and inside edge of the annular ring, said ridges extending into at least one side of the annular ring but not extending through the entire thickness of the annular ring and of such size and dimension to allow for outward flow of the spiral wound gasket when such spiral wound gasket is installed.

24. A method of forming a spiral wound gasket comprising:
  winding a first thin strip of metal into an inner ring of at least a about seven revolutions;
  securing each revolution of said inner ring to a preceding revolution of said inner ring along multiple points of each revolution; and
  winding a second thin strip of metal and a filler material into alternate layers around the inner ring to form a gasket element.

25. A method of forming a spiral wound gasket according to claim 24 wherein the revolutions of the first thin strip of metal are secured by one of spot welding or continuous welding.

26. A method of forming a spiral wound gasket according to claim 24 further comprising mounting said inner ring and said gasket element within an outer guide ring.

27. A method of forming a spiral wound gasket according to claim 24 wherein the first and second thin strips of metal are provided as a single, continuous strip.

* * * * *

UNITED STATES PATENT AND TRADEMARK OFFICE
CERTIFICATE OF CORRECTION

PATENT NO. : 5,964,468
DATED : October 12, 1999
INVENTOR(S) : Rickey W Chester, et al.

It is certified that error appears in the above-identified patent and that said Letters Patent is hereby corrected as shown below:

On the title page insert item -- [73] Garlock, Inc.
                                      Houston, Texas--

Signed and Sealed this

First Day of February, 2000

Attest:

Q. TODD DICKINSON

*Attesting Officer*        *Acting Commissioner of Patents and Trademarks*

UNITED STATES PATENT AND TRADEMARK OFFICE
CERTIFICATE OF CORRECTION

PATENT NO. : 5,964,468
DATED : October 12, 1999
INVENTOR(S) : Chester et al

It is certified that error appears in the above-identified patent and that said Letters Patent is hereby corrected as shown below:

column 14, line 20, Claim 24, delete the word "a".

Signed and Sealed this

Fourth Day of April, 2000

Attest:

Q. TODD DICKINSON

*Attesting Officer*      *Director of Patents and Trademarks*